United States Patent [19]
Hirunuma

[11] Patent Number: 5,886,777
[45] Date of Patent: Mar. 23, 1999

[54] ELECTRONIC DISTANCE MEASURING DEVICE

[75] Inventor: Ken Hirunuma, Tokyo, Japan

[73] Assignee: Asahi Kogaku Kogyo Kabushiki Kaisha, Tokyo, Japan

[21] Appl. No.: 634,038

[22] Filed: Apr. 17, 1996

[30] Foreign Application Priority Data

May 12, 1995 [JP] Japan ................................. 7-114640

[51] Int. Cl.⁶ ................................................. G01C 3/08
[52] U.S. Cl. ........................................... 356/5.12; 356/5.1
[58] Field of Search .................... 356/5.1, 5.12; 359/601, 613

[56] References Cited

U.S. PATENT DOCUMENTS

| | | | |
|---|---|---|---|
| 4,560,270 | 12/1985 | Wiklund et al. | 356/5.1 |
| 4,636,068 | 1/1987 | Niiho et al. | |
| 5,313,261 | 5/1994 | Leatham et al. | 356/4 |
| 5,430,537 | 7/1995 | Liessner et al. | 356/5.1 |

FOREIGN PATENT DOCUMENTS 2200810  10/1988  United Kingdom ................. 356/5.1

*Primary Examiner*—Ronald L. Biegel
*Attorney, Agent, or Firm*—Greenblum & Bernstein, P.L.C.

[57] ABSTRACT

An electronic distance measuring device that measures a distance from the electronic distance measuring device to an objective station. The electronic distance measuring device includes a radiation source for emitting frequency-modulated radiation towards a reflector disposed at the objective station, and a detector for detecting radiation reflected by the reflector. The distance of the objective station from the electronic distance measuring device is then calculated in accordance with the detected radiation. At least one radiation attenuating filter is positioned in a radiation path between the radiation source and the detector. The radiation attenuating filter is inclined with respect to a main axis of the radiation path so as to prevent incidence on the detector of an irregular reflection of the radiation by the attenuating filter.

21 Claims, 5 Drawing Sheets

ELECTRONIC DISTANCE MEASURING DEVICE

BACKGROUND OF THE INVENTION

The present invention relates to an electronic distance measuring device in which a phase difference of an oscillating wave, such as a light wave, that has traveled along two different light paths is used to measure a distance from the device to an objective station.

FIG. 1 shows a conventional electronic distance measuring device disclosed in U.S. Pat. No. 4,636,068.

A modulated light beam emitted from a light source 31 is reflected by a prism 33 through an objective lens 34 to be incident on a reflector 35 that is located at an objective station. The light is reflected by the reflector 35, transmitted towards the objective lens 34 and reflected by the prism 33 to be incident on a detector 42. The electronic distance measuring device measures a distance from the objective station by detecting a phase difference between the phase of the reflected light from the reflector 35 and the phase of the emitted light.

In the electronic distance measuring device in which the phase difference measuring method is employed, the accuracy of the distance measurement depends on the accuracy of the detection of the phase difference. Therefore, the accuracy of the detection of the phase difference must be very high in order to accurately measure the distance. In general, the order of the accuracy to detect the phase difference is approximately $10^{-7}$ second.

In order to accurately detect the phase difference, the electronic distance measuring device is required to discriminate a regular portion of the reflected light, which corresponds to the transmitted modulated light, from an irregular noise portion.

In general, a second order reflection light component of the irregular noise portion will disturb the discrimination of the regular portion of the reflected light more than the other irregular noise components. The second order reflection light component is defined as stray light that is generated when the regular modulated light is reflected by a high-reflectivity surface located in the light transmitting path 36A between the light source 31 and the objective lens 34, or in the light detecting path 36B between the objective lens 34 and the detector 42.

For instance, in the light transmitting path 36A, the second order reflection light component is generated when a portion of the light (light 41a) that is propagated along the light paths 36A and 36B is reflected by a high-reflectivity surface such as the detector 42. The reflected light (i.e., light 41a) is then propagated in the reverse direction along the light paths 36B and 36A, towards the light source 31. However, at the high-reflectivity surface of the light source 31, a portion 41b of the reflected light 41a is reflected back along the light paths 36A and 36B and is detected by the detector 42.

In order to solve this problem, the conventional electronic distance measuring device shown in FIG. 1 reduces the second order reflection light component by using two attenuating filters. One of the filters is mounted on shutter plate 38 located between the light source 31 and the prism 33. The other filter is a variable attenuation filter 40 located between the prism 33 and the detector 42.

The shutter plate 38, rotated by a motor 32, has two slits to divide the light emitted from the light source 31 into two portions. One portion of the emitted light is propagated along the light transmitting path 36A and the other portion is propagated along reference light path 37. A neutral density (hereinafter referred to as ND) filter 39 is placed in the slit of the shutter plate 38 in order to attenuate the light that is propagated along the light transmitting path 36A.

The variable attenuation filter 40 is formed as a circular disk. An amount of light transmitted through the circular disk varies along a circumferential direction thereof. A motor 43 rotates the variable attenuation filter 40 in order to change the amount of light transmitted therethrough.

The regular reflection light is transmitted through each of the attenuating filters twice along the optical path from the light source 31 to the detector 42. However, the second order reflection light component is transmitted through the attenuating filters at least four times along the optical path from the light source 31 to the detector 42. Accordingly, the intensity of the second order reflection light component at the detector 42 is much lower than the intensity of the regular reflection light.

However, in the electronic distance measuring device shown in FIG. 1, the ND filters become new sources for generating stray light, because the surfaces of the filters are also high-reflection surfaces. Therefore, it is not possible to increase the signal-to-noise (S/N) ratio. Accordingly, the accuracy of the detection of the phase difference is not very high.

Further, since the ND filter 39 is formed as an interference film by a vacuum evaporation method, it is difficult to reduce the reflectivity of the surface. Furthermore, since the ND filter of the variable attenuation filter 40 is formed as a glass plate, an anti-reflection film is required to reduce the reflection. This will increase the cost of manufacturing the ND filter, and therefore, the cost of manufacturing the electronic distance measuring device.

SUMMARY OF THE INVENTION

It is therefore an object of the present invention to provide an improved electronic distance measuring device in which the intensity of the second order reflection light components generated by the light source or the detector is reduced without introducing any new sources for generating optical noise.

According to a first aspect of the present invention, there is provided an electronic distance measuring device that measures a distance from the electronic distance measuring device to an objective station. The electronic distance measuring device includes a radiation source for emitting a frequency-modulated radiation towards a reflector disposed at the objective station, and a detector for detecting a radiation reflected by the reflector. The distance of the objective station from the electronic distance measuring device is then calculated in accordance with the detected radiation. At least one radiation attenuating filter is positioned in a radiation path between the radiation source and the detector. The radiation attenuating filter is inclined with respect to a main axis of the radiation path so as to prevent an incidence on the detector of an irregular reflection of the radiation by the attenuating filter.

Thus, the signal to noise ratio of the detected radiation can be improved, and therefore, the overall accuracy of the distance measurement can be increased.

In the preferred embodiment, the radiation attenuating filter is disposed between the radiation source and the reflector. Further, the attenuating filter is an independent element.

Preferably, the electronic distance measuring device further includes a switching shutter having two slits for transmitting the radiation, and a device, such as a motor, for rotating the switching shutter about its central axis. Further, the radiation attenuating filter fits into one of the slits. Therefore, the radiation attenuating filter can be easily moved into and out of the radiation path as required.

Optionally, the switching shutter is a flat disk. A normal surface of the flat disk surface is inclined with respect to the main axis of the radiation path. Therefore, the irregular noise portion of the radiation is reflected out of the radiation path, and therefore the signal to noise ratio of the radiation is increased.

Alternatively, the switching shutter is a disk having a flat central portion and a beveled peripheral portion. A normal of the flat center portion is parallel to a main axis of the radiation path, but the normal of the beveled peripheral portion is inclined with respect to the main axis of the radiation path. One of the slits is formed in the beveled peripheral portion, with the radiation attenuating filter being fitted into the slit formed in the peripheral portion.

Therefore, the radiation attenuating filter is inclined with respect to the main axis of the radiation path. Thus, the irregular noise portion of the radiation is reflected out of the radiation path, and the signal to noise ratio of the radiation is increased.

Optionally, the radiation attenuating filter is disposed between the detector and the reflector. In this case, the amount of radiation transmitted through the radiation attenuating filter varies along a circumferential direction.

In the preferred embodiment the electronic distance measuring device includes a first radiation attenuating filter and a second radiation attenuating filter. The first radiation attenuating filter and the second radiation attenuating filter are inclined with respect to the main axis of the radiation path. In this case, the first radiation attenuating filter is disposed between the radiation source and the reflector and the second radiation attenuating filter is disposed between the detector and the reflector.

Thus, since both the first attenuating filter and the second attenuating filter are inclined to the main axis of the radiation path, the irregular noise will be reflected out of the radiation path, and therefore, the signal to noise ratio will be increased.

According to another aspect of the present invention, there is provided an electronic distance measuring device that measures a distance from the electronic distance measuring device to an objective station. The electronic distance measuring device includes a device for emitting a frequency-modulated light towards a reflector disposed at the objective station, and a device for detecting light reflected from the reflector. The distance of the objective station from the electronic distance measuring device is calculated in accordance with the detected light. At least one device for attenuating the emitted light is positioned in an optical path between the device for emitting light and the device for detecting light. The device for attenuating the emitted light is inclined with respect to a main axis of the optical path.

DETAILED DESCRIPTION OF THE EMBODIMENTS

The embodiments of the present invention will now be described hereinafter with reference to the drawings.

Figure 1:
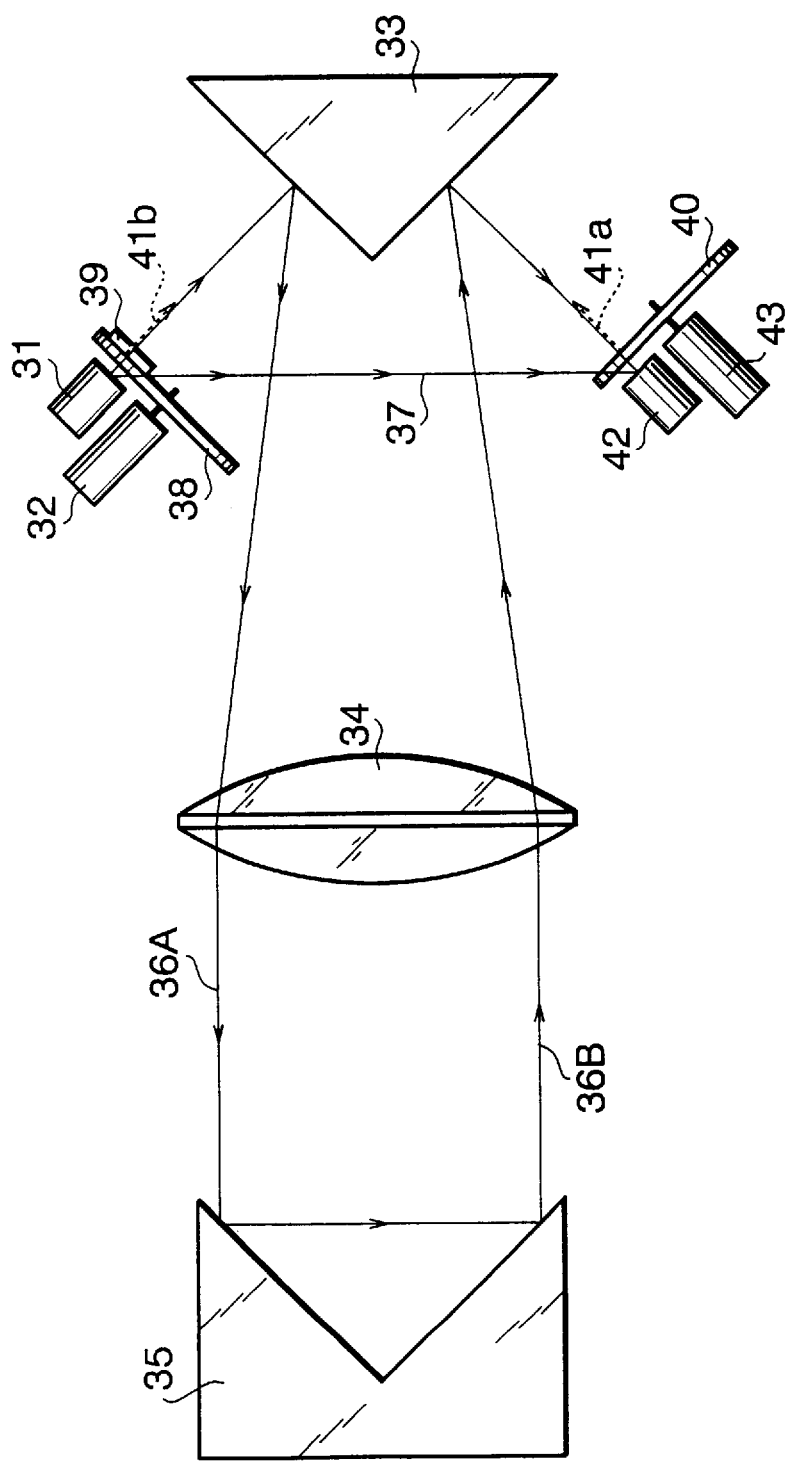
FIG. 1 shows an optical system of a conventional electronic distance measuring device.
Figure 2:
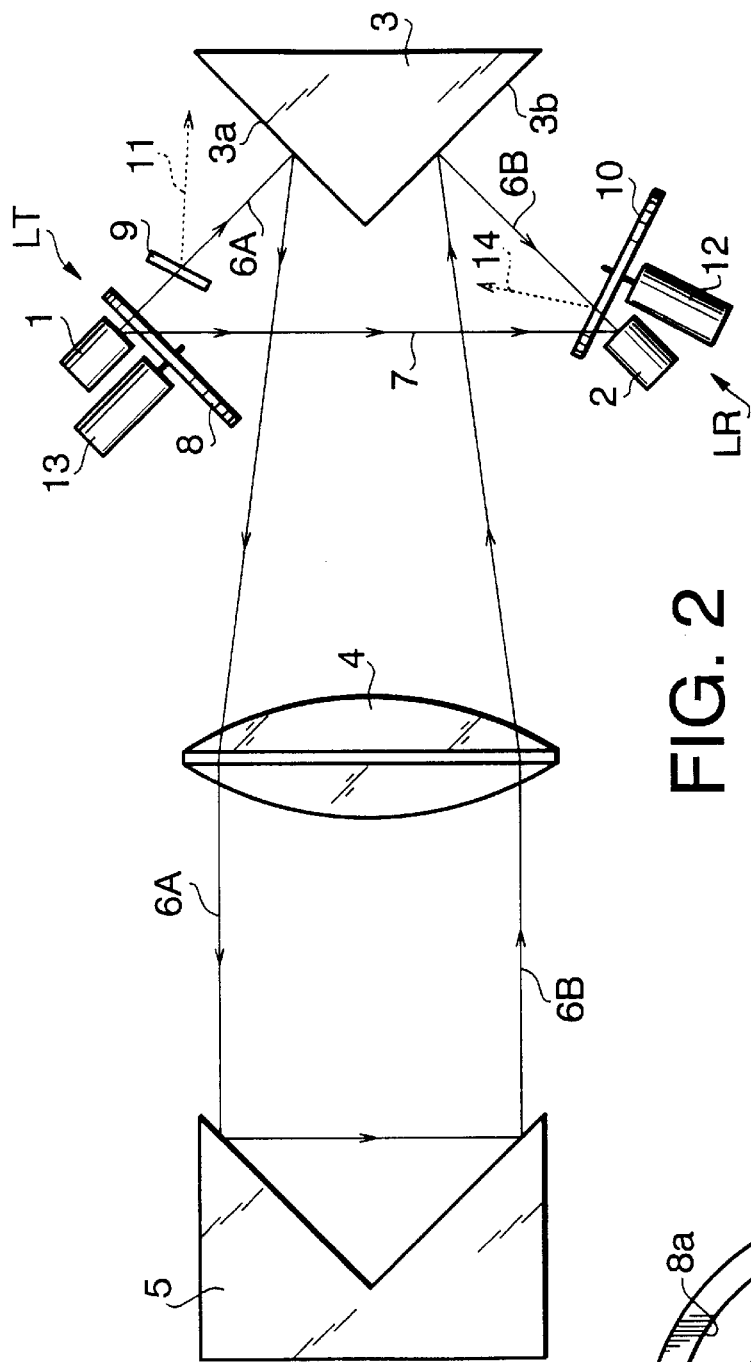
FIG. 2 shows an optical system of an electronic distance measuring device according to a first embodiment of the present invention.

FIG. 2 shows an electronic distance measuring device according to a first embodiment of the present invention.

As shown in FIG. 2, an electronic distance measuring device is provided with a light transmitting unit LT to transmit a measuring light along a transmitting path 6A toward a reflector 5 located at an objective station. The electronic distance measuring device also includes a light receiving unit LR to receive light reflected from the reflector 5 along a receiving path 6B, an objective lens 4 located along a common path of the light transmitting path 6A and the light receiving path 6B, and an optical path dividing prism 3 for dividing the transmitting path 6A and the receiving path 6B.

The measuring light, which is a first portion of the light emitted from the light transmitting unit LT, is reflected by a first reflection surface 3a of the prism 3, refracted by the objective lens 4, to be incident on the reflector 5. The measuring light reflected from the reflector 5 passes through the objective lens 4 and is reflected by a second reflection surface 3b of the prism 3 to be incident on the light receiving unit LR.

A reference light, which is a second portion of the light emitted from the light transmitting unit LT, is propagated along a reference path 7 and is received directly by the light receiving unit LR.

The transmitting path 6A may partially or completely overlap the receiving path 6B. In the first embodiment, the light path between the prism 3 and the reflector 5 is common to both the transmitting light path 6A and the receiving light path 6B. When the two light paths 6A and 6B are partially overlapped, a light dividing means, such as the prism 3, is disposed at the boundary of the common path. However, a beam splitter, a mirror, a prism or a bifurcate optical fiber may also be used as the light dividing means.

The light transmitting unit LT contains a light source (radiation source) 1, such as a light emitting diode, which emits light modulated with a predetermined frequency by a modulating circuit (not shown). The light transmitting unit LT also includes a switching shutter 8 that is rotated by a motor 13 with a predetermined constant angular speed, and an ND filter 9 for attenuating the light.

The modulated light emitted from light source 1 passes through the switching shutter 8 and the ND filter 9, and is reflected by the first reflecting surface 3a of the prism 3, refracted by the objective lens 4, and is incident on the reflector 5. Since the light source 1 is substantially coincident with the focusing point of the objective lens 4, the light refracted by the objective lens 4 towards the reflector 5 becomes a parallel light beam.

Figure 3:
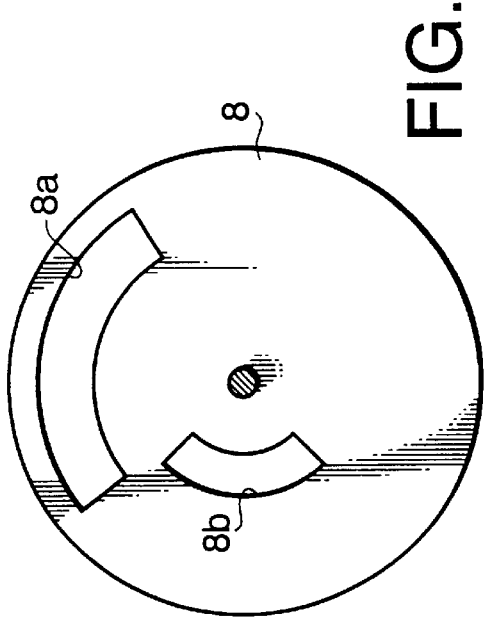
FIG. 3 is a plan view of a switching shutter of the electronic distance measuring device shown in FIG. 2.

The switching shutter 8 is formed as a flat circular disk on which two slits 8a and 8b are arranged. As shown in FIG. 3, the two arc-shaped slits 8a and 8b have the same width (i.e., measured in the radial direction) but each slit is located at a different radial distance from a center of the disk. Further, slit 8a extends along a different predetermined angular range than the slit 8b, with each of the predetermined angular ranges not overlapping each other. The slits 8a and 8b determine which of two light paths 6A and 7, the light is to be propagated along. The light which is transmitted through slit 8a is directed along the transmitting path 6A, and provides the measuring light. Similarly, the light which is transmitted through the slit 8b is directed along the reference path 7, and provides reference light. Further, the size of the light emitting surface of the light source 1 is such that as the switching shutter 8 rotates, only one of the measuring light or the reference light is emitted from the light transmitting unit LT. Furthermore, the measuring light and the reference light are alternately emitted from the light transmitting unit LT.

The ND filter 9 reduces the intensity of the light passing therethrough. Further, the ND filter 9 is arranged so that the normal of the filter makes an angle of 5 to 10 degrees with respect to the center axis of the light transmitting path 6A, between the light source 1 and the prism 3. Accordingly, if the light reflected by the first surface 3a is incident on the ND filter 9, the portion of the irregular light 11 that is reflected by the ND filter 9 is reflected out of the transmitting path 6A and is not propagated back towards the detector 42.

The reflector 5 is a corner cube prism which reflects the measuring light along a direction parallel to the transmitting light path 6A for any incident angle of the measuring light.

The light receiving unit LR contains a variable attenuation filter 10 and a motor 12 for adjusting the angle of rotation of variable attenuation filter 10. The light receiving unit LR also includes a detector 2 that receives the measuring light and the reference light transmitted through the variable attenuation filter 10. Since the light receiving surface of the detector 2 is substantially coincident with the focal point of the objective lens 4, the measuring light is converged on the light receiving surface of the detector 2.

The variable attenuation filter 10 is formed as a circular disk having a light transmitting property which gradually varies along a circumferential direction thereof. The intensity of the transmitted light through the variable attenuation filter 10 is adjusted by changing the angular position of the variable attenuation filter 10. The angular position of the variable attenuation filter 10 is determined in accordance with the distance of the electronic distance measuring device from the reflector 5 such that the intensity of the measuring light incident on the detector 2 remains constant for all distances.

The variable attenuation filter 10 is arranged so that a normal thereof makes an angle of 10 to 10 degrees with respect to the center axis of the receiving light path 6B, between the detector 2 and the prism 3. Thus, the normal is parallel to the rotation axis of the variable attenuation filter 10. Accordingly, an irregular light 14 is reflected by the variable attenuation filter 10 out of the receiving path light 6B.

The detector 2 converts the detected light into an electronic signal. A phase difference detecting circuit (not shown) compares the phase of the electronic signal output from the detector 2 with the phase of the modulation signal that is used for modulating the light source 1. The phase of the reference light detected by the detector 2 is also compared with the modulation signal in the phase difference detecting circuit. The phase difference detecting circuit outputs two phase difference signals, (i.e., the first phase difference signal shows a difference between the measuring light and the modulation signal, and the second phase difference signal shows the difference between the reference light and the modulating signal). A distance calculating circuit (not shown) determines the distance of the objective station from the electronic distance measuring device by subtracting the second phase difference signal from the first phase difference signal.

The operation of the electronic distance measuring device will now be described.

The measuring light is emitted from the light source 1, and is transmitted through the switching shutter 8 and the ND filter 9, to the first reflecting surface 3a of the prism 3. The first reflecting surface 3a of the prism 3 reflects the light through the objective lens 4 to the reflector 5. The regular portion of the measuring light is reflected by the reflector 5 through the objective lens 4, and then reflected by the second reflecting surface 3b through the variable attenuation filter 10, and detected by the detector 2. Accordingly, the regular portion of the measuring light is transmitted through the ND filter 9 once, and the variable attenuation filter 10 once.

However, the irregular portion of the measuring light generated at the light emitting surface of the light source 1 or the light receiving surface of the detector 2 is transmitted through the ND filter 9 twice and the variable attenuation filter 10 twice.

More specifically, one portion of the measuring light that is emitted from the light source 1 and is transmitted through the ND filter 9, reflected by the first surface 3a of the prism 3 and reflected by the reflector 5, is reflected back to be incident on the light source 1. The light is then reflected by the light emitting surface of the light source 1 through the ND filter 9. The light is then reflected by the first surface 3a of the prism 3, the reflector 5 and the second surface 3b of the prism 3 to be incident on the detector 2 through the variable attenuation filter 10. As a result, the second order reflection light component is incident on the detector 2, with an intensity that has been reduced three times by the ND filter 9 and once by the variable attenuation filter 10.

Similarly, the intensity of the second order reflection light component generated by the receiving surface of the detector 2 is reduced once by the ND filter 9 and three times by the variable attenuation filter 10.

Accordingly, the intensity of the second order reflection light component generated by the reflection at the light source 1 or the detector 2 can be substantially reduced when compared with the intensity of the regular measuring light.

Further, since the ND filter 9 and the variable attenuation filter 10 are inclined with respect to the center axis of the optical path, the irregular reflection light components generated as a result of reflection of the light on the surfaces of the ND filter 9 and the variable attenuation filter 10, are reflected out of the light paths 6A and 6B. Therefore, the second order reflection light components which are generated by the ND filter 9 and the variable attenuation filter 10 are not propagated along the light paths 6A or 6B.

As a result of the construction of the first embodiment, the optical noise is reduced, and further, the signal-to-noise ratio of the detected phase difference signal is increased. Thus, the accuracy of the distance measurement is also increased.

Although, the ND filter 9 and the variable attenuation filter 10 are employed it is possible to reduce the second order light components by using only one of the filters. This will simplify the construction and lower the cost of manufacturing the electronic distance measuring device.

Figure 4:
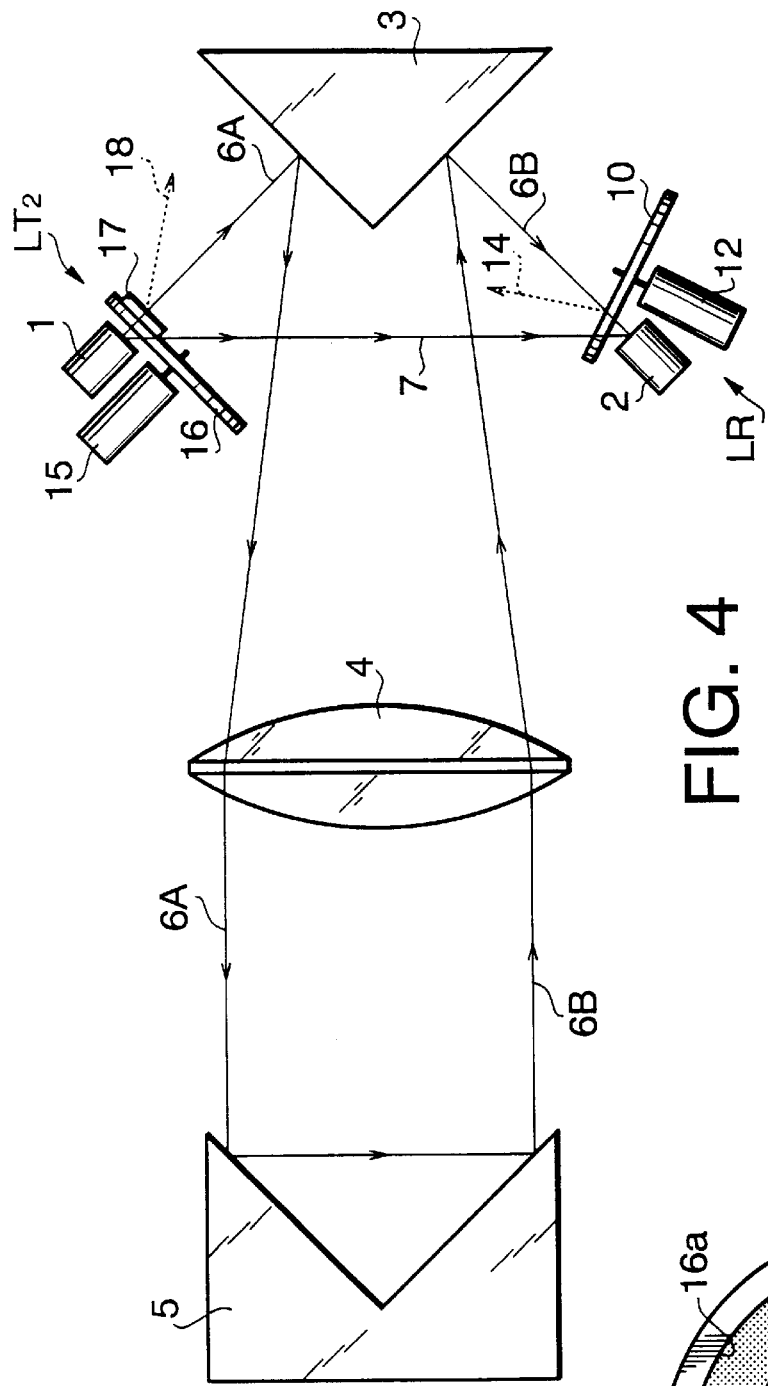
FIG. 4 shows an optical system of an electronic distance measuring device according to the second embodiment of the present invention.
Figure 5:
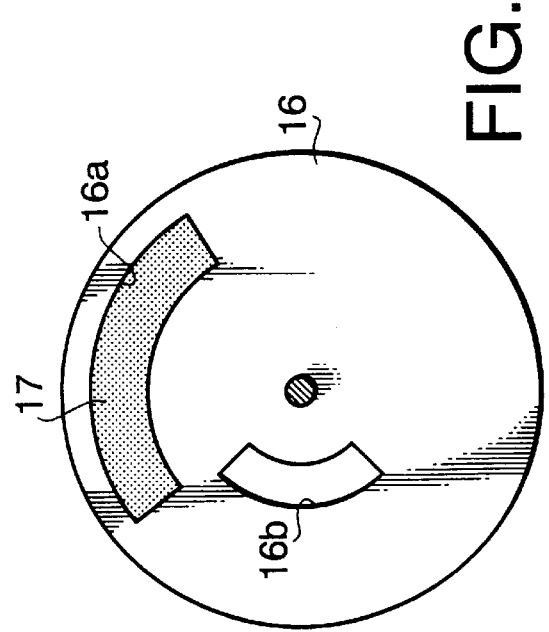
FIG. 5 is a plan view of a switching shutter of the electronic distance measuring device shown in FIG. 4.

FIGS. 4 and 5 show the electronic distance measuring device according to the second embodiment of the invention. The second embodiment is similar to the first embodiment described above, with the common elements having the same reference numerals.

In the second embodiment, a light transmitting unit LT2 contains the light source 1 and a switching shutter 16 that is rotated by a motor 15. The switching shutter 16 is formed as a circular disk and arranged so that the normal thereof makes an angle of 5 to 10 degrees with respect to the center axis of the transmitting path 6A between the light source 1 and the prism 3. Since the rotation axis of the motor 15 is parallel to the normal, the motor 15 is also arranged so that the rotation axis is inclined with respect to the center axis of the transmitting path 6A.

In the second embodiment, the switching shutter 16 is provided with two arc shaped slits 16a and 16b as shown in FIG. 5. As shown in FIG. 5, the two arc-shaped slits 16a and 16b have the same width (i.e., measured in the radial direction) but each slit is located at a different radial distance from the center of the disk. Further, the slit 16a extends along a different predetermined angular range than the slit 16b, with each of the predetermined angular ranges not overlapping each other. The slits 16a and 16b determine which of two light paths the light is to be propagated. The light which is transmitted through slit 16a is directed along the transmitting path 6A, and provides the measuring light. Similarly, the light which is transmitted through the slit 16b is directed along the reference path 7, and provides the reference light. As the switching shutter 16 rotates, the measuring light and the reference light are alternately emitted from the light transmitting unit LT.

As further shown in FIG. 5, the slit 16a also includes an ND filter 17 which has the same function as the ND filter 9 of the first embodiment. However, slit 16b is not provided with any filter.

Since the ND filter 17 is a parallel plate and the exit side surface thereof is parallel to the disk surface of the switching shutter 16, if the light reflected from the first surface 3a is incident on the ND filter 17, the irregular light 18 incident on the ND filter 17 is reflected out of the transmitting path 6A.

Therefore, in the second embodiment, the optical noise is also reduced, and thus, the signal-to-noise ratio of the phase difference detecting signal can be increased. As a result the accuracy of the distance measurement is increased.

Figure 6:
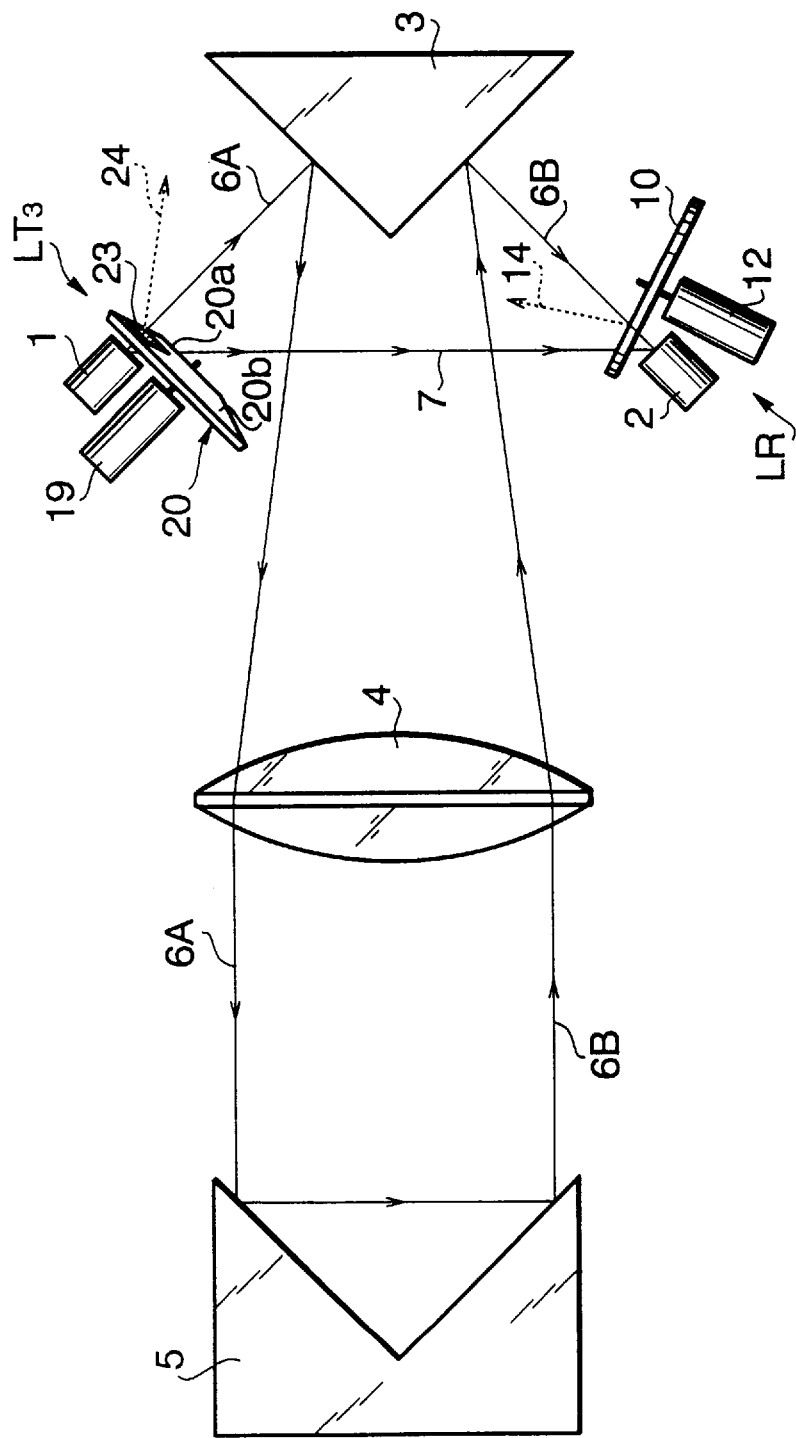
FIG. 6 shows an optical system of an electronic distance measuring device according to a third embodiment of the present invention.
Figure 7:
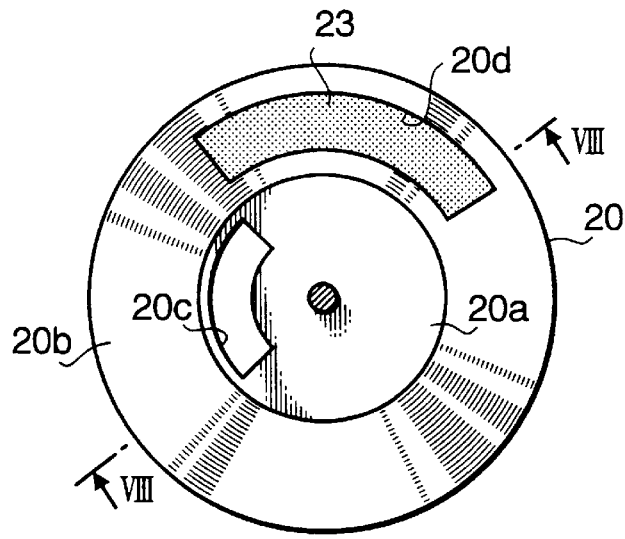
FIG. 7 is a plan view of a switching shutter of the electronic distance measuring device shown in FIG. 6.
Figure 8:
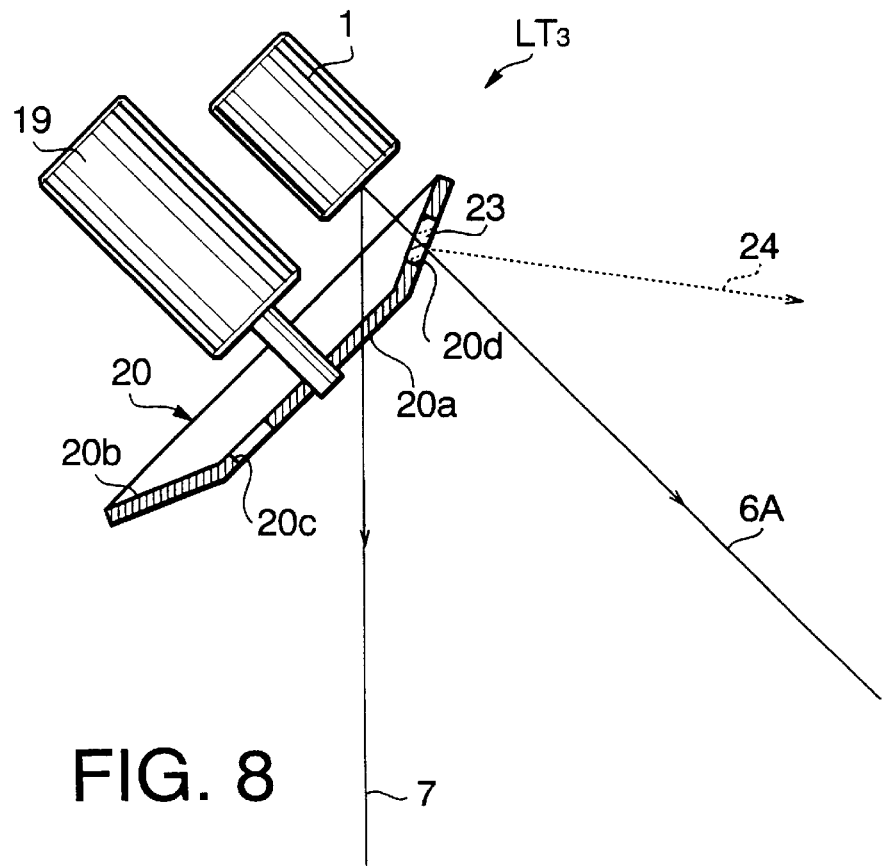
FIG. 8 shows a cross-sectional view of the switching shutter shown in FIG. 7.

FIGS. 6, 7 and 8 show an electronic distance measuring device according to a third embodiment of the present invention. The third embodiment is similar to the first embodiment with the common elements having the same reference numerals.

In the third embodiment, a light transmitting unit LT3 includes the light source 1 and a switching shutter 20 that is rotated by a motor 19. The switching shutter 20 is formed as a circular disk of which central portion 20a is flat and peripheral portion 20b is beveled towards the direction of the motor 19, as shown in the cross-section of FIG. 8. Further, an arc-shaped slit 20c is formed in the central portion 20a of the shutter 20, and another arc-shaped slit 20d is formed in the peripheral portion 20b, as shown in FIG. 7.

An ND filter 23 is placed in the arc-shaped slit 20d, and reduces the intensity of the emitted light in a similar manner to that described for the ND filter 9 of the first embodiment. The arc-shaped slit 20c is not provided with any filter.

The rotation axis of the motor 19 is parallel to the center axis of the transmitting path 6A, and the center portion 20a of the switching shutter 20 is perpendicular to the rotation axis. The peripheral portion 20b is formed so that the normal thereof at the point intersecting the center axis of the transmitting path 6A makes an angle of 5 to 10 degrees with respect to the center axis.

Since the ND filter 23 is inclined with respect to the center axis of the transmitting path 6A, if the light reflected from the first surface 3a is incident on the ND filter 23, then irregular light 24 is reflected by the ND filter 23 out of the transmitting path 6A.

Therefore, in the third embodiment, the optical noise is also reduced, and thus, the signal-to-noise ratio of the phase difference detecting signal can be reduced. As a result the accuracy of the distance measurement is increased.

The present disclosure relates to subject matter contained in. Japanese patent application No. H7-114640 (filed on May 12, 1995) which is expressly incorporated herein by reference in its entirety.

What is claimed is:

1. An electronic distance measuring device that measures a distance from said electronic distance measuring device to an objective station, said electronic distance measuring device comprising:

a radiation source that emits a modulated radiation towards a reflector disposed at said objective station;

a detector that detects radiation reflected by said reflector, said detector outputting an electrical signal in accordance with said detected radiation, wherein said distance is calculated in accordance with said electrical signal output by said detector;

at least one radiation attenuating filter positioned in a radiation path between said radiation source and said detector, said at least one radiation attenuating filter being inclined with respect to a main axis of said radiation path so as to prevent an incidence on said detector of an irregular reflection of said radiation by said attenuating filter;

a path selecting device that selects one of two paths for transmitting said emitted modulated radiation; and a controller that controls said path selecting device to alternately select said paths.

2. The electronic distance measuring device according to claim 1, wherein said at least one radiation attenuating filter is disposed between said radiation source and said reflector.

3. The electronic distance measuring device according to claim 2, wherein said at least one attenuating filter is an independent element.

4. The electronic distance measuring device according to claim 2, wherein said path selecting device and said controller comprise:

a switching shutter having two slits for transmitting said radiation; and a rotating device that rotates said switching shutter about a central axis thereof, wherein said at least one radiation attenuating filter fits into one of said two slits.

5. The electronic distance measuring device according to claim 4, wherein said switching shutter comprises a flat disk with a normal of a surface of said flat disk surface being inclined with respect to said main axis of said radiation path.

6. The electronic distance measuring device according to claim 4, wherein said switching shutter comprises a disk having a flat central portion and a beveled peripheral portion, a normal of said flat center portion being parallel to said main axis of said radiation path, and a normal of said beveled peripheral portion being inclined with respect to said main axis of said radiation path, wherein one of said two slits is formed in said beveled peripheral portion, said at least one radiation attenuating filter being fitted into said slit formed in said peripheral portion.

7. The electronic distance measuring device according to claim 1, wherein said at least one radiation attenuating filter is disposed between said detector and said reflector.

8. The electronic distance measuring device according to claim 7, further comprising means for rotating said at least one radiation attenuating filter, said at least one radiation attenuating filter adjusting an amount of radiation transmitted therethrough, wherein said amount of radiation transmitted therethrough varies along a circumferential direction thereof.

9. The electronic distance measuring device according to claim 1, wherein said radiation comprises a light, and wherein said at least one radiation attenuation filter comprises a neutral density filter.

10. An electronic distance measuring device that measures a distance from said electronic distance measuring device to an objective station, said electronic distance measuring device comprising:

a radiation source that emits a modulated radiation towards a reflector disposed at said objective station;

a detector that detects radiation reflected by said reflector, said detector outputting an electrical signal in accordance with said detected radiation, wherein said distance is calculated in accordance with said electrical signal output by said detector; and at least one radiation attenuating filter positioned in a radiation path between said radiation source and said detector, said at least one radiation attenuating filter being inclined with respect to a main axis of said radiation path so as to prevent an incidence on said detector of an irregular reflection of said radiation by said attenuating filter, wherein said at least one radiation attenuating filter comprises a first radiation attenuating filter and a second radiation attenuating filter, said first radiation attenuating filter and said second radiation attenuating filter being inclined with respect to said main axis of said radiation path, wherein said first radiation attenuating filter is disposed between said radiation source and said reflector and said second radiation attenuating filter is disposed between said detector and said reflector.

11. The electronic distance measuring device according to claim 10, wherein said first radiation attenuating element is an independent element.

12. The electronic distance measuring device according to claim 10, further comprising:

a switching shutter having two slits for transmitting said radiation; and means for rotating said switching shutter about a central axis thereof, wherein said first radiation attenuating filter fits into one of said two slits.

13. The electronic distance measuring device according to claim 12, wherein said switching shutter comprises a flat disk with a normal of a surface of said flat disk surface being inclined with respect to said main axis of said radiation path.

14. The electronic distance measuring device according to claim 12, wherein said switching shutter comprises a disk having a flat central portion and a beveled peripheral portion, a normal of said flat center portion being parallel to said main axis of said radiation path, and a normal of said beveled peripheral portion being inclined to said main axis of said radiation path, wherein one of said two slits is formed in said beveled peripheral portion, one of said first radiation attenuating filter and said second radiation attenuating filter being fitted into said slit formed in said peripheral portion.

15. The electronic distance measuring device according to claim 12, further comprising means for rotating said second radiation attenuating filter, said second radiation attenuating filter adjusting an amount of radiation transmitted therethrough, wherein said amount of radiation transmitted therethrough varies along a circumferential direction thereof.

16. The electronic distance measuring device according to claim 10, further comprising means for rotating said second radiation attenuating filter, said second radiation attenuating filter adjusting an amount of radiation transmitted therethrough, wherein said amount of radiation transmitted therethrough varies along a circumferential direction thereof.

17. An electronic distance measuring device that measures a distance from said electronic distance measuring device to an objective station, said electronic distance measuring device comprising:

means for emitting a modulated light towards a reflector disposed at said objective station;

means for detecting light reflected from said reflector, wherein said distance is calculated in accordance with said detected light;

at least one means for attenuating said emitted modulated light, said at least one means for attenuating said emitted modulated light being positioned in an optical path between said means for emitting modulated light and said means for detecting light, said at least one means for attenuating said emitted modulated light being inclined with respect to a main axis of said optical path;

path selecting means for selecting one of two paths for transmitting said emitted modulated light; and means for controlling said path selecting means to alternately select said paths.

18. The electronic distance measuring device according to claim 17, wherein said path selecting means comprises a switching shutter, said switching shutter comprising two slits for transmitting light therethrough, one of said slits accommodating said at least one means for attenuating said emitted modulated light.

19. The electronic distance measuring device according to claim 18, wherein said switching shutter comprises a flat circular disk, a normal to a surface of said flat disk being inclined with respect to said main axis of said optical path.

20. The electronic distance measuring device according to claim 18, wherein said switching shutter comprises a disk having a flat central portion and a beveled peripheral portion, a normal of said flat center portion being parallel to said main axis of said optical path and a normal of said beveled peripheral portion being inclined with respect to said main axis of said optical path, wherein one of said slits is formed in said beveled peripheral portion, said at least one means for attenuating said emitted frequency-modulated light being fitted into said slit formed in said peripheral portion.

21. The electronic distance measuring device according to claim 17, wherein said at least one means for attenuating said emitted frequency-modulated light comprises a neutral density filter.

* * * * *

UNITED STATES PATENT AND TRADEMARK OFFICE
CERTIFICATE OF CORRECTION

PATENT NO.   : 5,886,777
DATED        : March 23, 1999
INVENTOR(S)  : K. HIRUNUMA It is certified that error appears in the above-identified patent and that said Letters Patent is hereby corrected as shown below:

At column 10, line 61 (claim 20, line 10) of the printed patent, "frequency-modulated" should be ---modulated---; and Signed and Sealed this Eighth Day of February, 2000

Attest:

Q. TODD DICKINSON

Attesting Officer

Commissioner of Patents and Trademarks

UNITED STATES PATENT AND TRADEMARK OFFICE
CERTIFICATE OF CORRECTION

PATENT NO. : 5,886,777
DATED : March 23, 1999
INVENTOR(S) : K. HIRUNUMA

It is certified that error appears in the above-identified patent and that said Letters Patent is hereby corrected as shown below:

At column 10, line 64 (claim 21, line 3) of the printed patent, "frequency-modulated" should be ---modulated---.

Signed and Sealed this

Tenth Day of October, 2000

Attest:

Q. TODD DICKINSON

Attesting Officer

Director of Patents and Trademarks